United States Patent
Nakazawa et al.

(10) Patent No.: US 6,788,994 B2
(45) Date of Patent: Sep. 7, 2004

(54) OPERATION DATA ACCUMULATION AND TRANSMISSION DEVICE, OPERATION MANAGEMENT DEVICE, AND OPERATION MANAGEMENT SYSTEM

(75) Inventors: Yuichi Nakazawa, Yamatokoriyama (JP); Masahiro Komatsu, Yamatokoriyama (JP); Makoto Fujishima, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 10/455,501

(22) Filed: Jun. 6, 2003

(65) Prior Publication Data

US 2003/0229414 A1 Dec. 11, 2003

(30) Foreign Application Priority Data

| Jun. 10, 2002 | (JP) | 2002-168499 |
| Jun. 10, 2002 | (JP) | 2002-168706 |
| Jun. 10, 2002 | (JP) | 2002-168993 |

(51) Int. Cl.$^7$ .......................... G06F 19/00; G05B 11/01
(52) U.S. Cl. .......................... 700/175; 700/9; 700/108; 700/169
(58) Field of Search .......................... 700/9, 108, 169, 700/174, 175

(56) References Cited

U.S. PATENT DOCUMENTS

| 5,291,416 A | * | 3/1994 | Hutchins ..................... 700/174 |
| 5,388,051 A | * | 2/1995 | Seki et al. ................... 700/169 |
| 6,038,486 A | * | 3/2000 | Saitoh et al. ................. 700/96 |
| 6,438,444 B1 | * | 8/2002 | Mizuno et al. ............. 700/169 |
| 6,496,751 B1 | * | 12/2002 | Salvo et al. ................. 700/196 |
| 2002/0013639 A1 | * | 1/2002 | Fujishima et al. .......... 700/175 |

FOREIGN PATENT DOCUMENTS

| JP | 5-138468 | 6/1993 |
| JP | 5-138511 | 6/1993 |
| JP | 7-93024 | 4/1995 |
| JP | 10-161718 | 6/1998 |
| JP | 2001-265427 | 9/2001 |

* cited by examiner

Primary Examiner—Leo Picard
Assistant Examiner—Douglas S. Lee
(74) Attorney, Agent, or Firm—Westerman, Hattori Daniels & Adrian, LLP

(57) ABSTRACT

An operation management system 1 according to the present invention is configured so as to connect an operation data accumulation and transmission device 10 connected to an NC unit 16 to an operation management device via telecommunication circuits 20. The operation data collection and transmission device 10 collects data on an operating condition of a machine tool 15 to store the same in an operation data storage section 12, and based on the accumulated operating condition data, generates transmit data with a configuration for associating a data-element identifier which defines an item concerning operating condition with operating condition data corresponding to this item to transmit the same to the operation management device. The operation management device analyzes the data-element identifier of the received data, recognizes the operating condition item and updates the operating condition data in databases corresponding to the recognized item by the received operating condition data.

10 Claims, 16 Drawing Sheets

F I G. 3

| Table Name | Item |
|---|---|
| Operating state A | accumulated power-on time / accumulated operating time / accumulated alarm occurrence time / accumulated cutting time / accumulated main spindle rotation time / accumulated manual mode time / accumulated coolant discharge time |
| Operating state B | machine condition / 0 number under-machining / sequence number / operation mode / single block flag / optional stop flag / block delete flag / dry run flag / coolant on flag / rapid traverse override |
| Operating state C | machine condition / starting date and time of the present condition (= completing date and time of the previous condition) / 0 number of the present condition |
| Machining performance | machining start date and time / machining completion date and time / 0 number |
| Alarm history | occurrence date and time / alarm number / alarm message / 0 number in occurrence |
| Other | machine ID / user code / contact address |

| Item | Tag |
|---|---|
| Machine ID | <SERIAL_NUMBER> |
| User code | <USER_CODE> |
| Contact address | <CONTACT_ADD> |
| Operating state A and B | <M_MCNDTL> |
| Operating state C | <M_MCNSTS> |
| Machining performance | <M_MNFRSL> |
| Alarm history | <M_ALMHIS> |

FIG. 12

Header
{
Date: Fri, 22 Feb 2002 07:59:18
Subject: * * * * * * * * *
To: * * * *@* * * *.co.jp
}

Text
{
<SERIAL_NUMBER>
"NV5000"
</SERIAL_NUMBER>
<USER_CODE>
"1234567"
</USER_CODE>
<CONTACT_ADD>
"090-1234-5678"
</CONTACT_ADD>
<M_MCNDTL>
1,"01000"," ",a,b,c,d,e,f,g,h,I,j,k,l,m,n,o,p,q
</M_MCNDTL>
<M_MCNSTS>
r,"01000",3
s,"00100",2
t
</M_MCNSTS>
<M_MNFRSL>
r,s,"01000"
</M_MNFRSL>
<M_ALMHIS>
"EX0230"," Please set to magazine automatic mode."
"01000", u
</M_ALMHIS>
}

FIG. 16

| SH630 | | | | | | | |
|---|---|---|---|---|---|---|---|
| Occurrence date and time | Alarm number | Machine ID | Alarm message | Parts number | Order number | Production total group | Process number |
| 01/01/17 P.M. 06:12:33 | 501 | SH630 | Over travel : - | SH630 00542 | 01/01/17 | | 00542 |
| 01/01/17 P.M. 06:03:40 | 500 | SH630 | Over travel : + | SH630 05296 | 01/01/17 | | 05296 |
| 01/01/17 P.M. 05:44:25 | 5010 | SH630 | Program end | SH630 05296 | 01/01/17 | | 05296 |
| 01/01/17 P.M. 05:09:53 | 500 | SH630 | Over travel : + | SH630 00003 | 01/01/17 | | 00003 |
| 01/01/17 P.M. 05:06:51 | EX2028 | SH630 | Turn on the single block switch | SH630 00003 | 01/01/17 | | 00003 |
| 01/01/17 P.M. 03:29:07 | 500 | SH630 | Over travel : + | SH630 05296 | 01/01/17 | | 05296 |
| 01/01/16 P.M. 01:48:48 | 501 | SH630 | Over travel : - | SH630 05289 | 01/01/16 | | 05289 |
| 01/01/15 P.M. 09:42:00 | EX2028 | SH630 | Turn on the single block switch | SH630 00542 | 01/01/15 | | 00542 |
| 01/01/15 A.M. 09:28:54 | EX0818 | SH630 | P.P panel mode is... | SH630 00542 | 01/01/15 | | 00542 |
| 01/01/15 A.M. 09:27:23 | EX1823 | SH630 | Conveyance fork is in the home position | SH630 00542 | 01/01/15 | | 00542 |
| 01/01/15 A.M. 09:26:26 | EX1823 | SH630 | Conveyance fork is in the home position | SH630 00542 | 01/01/15 | | 00542 |
| 01/01/15 A.M. 07:04:07 | 3008 | SH630 | Index com not in go | SH630 00999 | 01/01/14 | | 00999 |
| 01/01/13 A.M. 11:52:59 | 501 | SH630 | Over travel : - | SH630 05135 | 01/01/13 | | 05135 |
| 01/01/13 A.M. 11:49:18 | 501 | SH630 | Over travel : - | SH630 05135 | 01/01/13 | | 05135 |
| 01/01/13 A.M. 10:58:30 | EX0730 | SH630 | The pallet has not been clamped | SH630 00001 | 01/01/13 | | 00001 |

Display condition

Machine ID  SH630
Parts number
Order number
Production total group
Process number ● Occurrence date  01/01/12  ~  01/01/18
○ Without date specification

[Display]

OPERATION DATA ACCUMULATION AND TRANSMISSION DEVICE, OPERATION MANAGEMENT DEVICE, AND OPERATION MANAGEMENT SYSTEM

BACKGROUND OF THE INVENTION

1. Field of the Invention

The present invention relates to an operation data accumulation and transmission device which is connected to a numerical control section of a machine tool provided with said numerical control section, collects and accumulates data concerning an operating condition of the machine tool, and transmits accumulated data to an operation management device via telecommunication circuits, such as the Internet, and said operation management device, and also to an operation management system provided therewith.

2. Description of the Prior Art

An operation management system which connects each numerical control section of a plurality of NC machine tools provided with said numerical control section to an operation management device via telecommunication circuits (including LAN, the Internet or the like) is conventionally known. In this operation management system, data on an operating condition of the machine tool is collected from each said numerical control section by said operation management device and accumulated, and the operating condition of each NC machine tool is centrally managed based on accumulated data.

Specifically, for example in an operation management system which connects a numerical control section of a machine tool to an operation management device installed within the same site via the LAN, it is configured so that the operation management device may be connected to each numerical control section at any time, sample data concerning the operating condition from each numerical control section, and accumulate sampled operating condition data for every machine tool, and an operation management of each machine tool is performed based on accumulated operating condition data.

In addition, in an operation management system in which a numerical control section of a machine tool installed in a remote site and an operation management device are connected via the Internet, it is configured so that each numerical control section and the operation management device may always be connected via the Internet, operating condition data of the machine tool corresponding to each numerical control section may be transmitted therefrom to the operation management device at any time, and the operating condition data for every machine tool may be accumulated in the operation management device, and as a result of this, the operation management of each machine tool is performed based on the accumulated operating condition data.

However, in the operation management system via the LAN described above, when the machine tool for management target increases in number, the sampling intervals of said operating condition data will become longer according to the number, resulting in a problem, that is, the operating condition of the machine tool cannot accurately be grasped. In other words, in order to grasp accurately the operating condition of the machine tool, the machine tool for management target is naturally restricted in number, and as a result of this, a wide range of management cannot be performed. In addition, there is also a problem that the machine tool installed in a remote site can not be managed.

In addition, the LAN is used for transferring a machining program or the like in many cases, and a communication load thereof is in an environment which tends to make it heavier. For this reason, when it enters into such a situation, an oversight in taking the operating condition data may occur, and the above-mentioned operating condition cannot be accurately grasped.

In addition, similarly, in the operation management system via the Internet described above, when the number of machine tools for management target increases, the load of the operation management device becomes extremely heavy, thus the number of the machine tools for management target is restricted, and there is also a problem that a wide range of management cannot be performed. Then, if a load beyond a throughput is applied, an oversight in taking the operating condition data may occur, and the operating condition may not be accurately grasped like the above.

In addition, in the operation management system via the Internet described above, although the connection to the machine tool in the remote site is available, since it is necessary to always connect the numerical control section to the operation management device in order to collect accurate data, the system may be placed in a dangerous situations, such as unauthorized access, virus infection or the like. On the other hand, while the dangerous situations mentioned above can be mostly avoided if the numerical control section and the operation management device are not always connected and are connected only during the data transmission, only occasional machine condition, such as a time of alarm occurrence and a time of machining completion, or a time of regular communication or the like can be grasped, that is, there is a problem that accurate data can not be collected.

In addition, since the data to be transmitted is usually a series of data with a predetermined length for each item, which indicates the operating condition, such as "in operation", "in suspension", and "under-alarm", corresponding thereto, it is hard to distinguish which part corresponds to which operating condition item among the transmitted data, in the case of filing data, namely during the accumulation thereof, there is a problem that a processing error such as taking out, storing and accumulating the data which do not correspond to the operating condition item, is easily made. Moreover, when adding data to be transmitted in the future, etc., there is also a problem that modifications of data analysis program at the operation management device side are difficult.

The present invention is made in view of the actual situations given above, the object of the present invention is to provide the operation management system or the like which enables the easy and accurate filing of data, and at the same time being able to accurately grasp the operating condition of the machine tool.

SUMMARY OF THE INVENTION

The present invention for solving the above-mentioned problem relates to an operation data accumulation and transmission device of an operation management system which is configured to connect said operation data accumulation and transmission device to an operation management device via the telecommunication circuits, and said operation management device, and also to said operation management system.

Said operation data accumulation and transmission device is connected to a numerical control section of the machine tool provided with said numerical control section in one to one correspondence, collects and accumulates data on the operating condition of said machine tool, and transmits accumulated data to the operation management device via the telecommunication circuits, comprising:

operation data storage means for accumulating the data on the operating condition of said machine tool (operating condition data); and data collection and transmission means for performing a process for connecting said numerical control section, collecting the operating condition data of said machine tool, and storing the collected operating condition data in said operation data storage means, and a process for transmitting the operating condition data stored in said operation data storage means to said operation management device via said telecommunication circuits.

On the other hand, said operation management device is configured so as to receive the operating condition data transmitted from each of said operation data accumulation and transmission device, and accumulate the operating condition data of this machine tool.

According to this operation management system, first, the operating condition data of the machine tool corresponding to the numerical control section is collected therefrom by the data collection and transmission means of the operation data accumulation and transmission device and the collected operating condition data are stored in the operation data storage means. Incidentally, said operating condition is grasped as an item concerning an accumulated time, such as an accumulated power-on time, an accumulated operating time, and an accumulated alarm occurrence time, and an item concerning a condition of the machine tools, such as "in operation", "in suspension", and "under-alarm". In addition, the operating condition data consist of time data and condition data (for example, 0, 1) corresponding to the item, the corresponding item and data are associated with each other and stored in said operation data storage means.

Then, the operating condition data accumulated in the operation data storage means in such a manner is transmitted via the telecommunication circuits to said operation management device, and the operating condition data for every corresponding machine tool is accumulated.

Thus, according to this operation management system, since the operation data accumulation and transmission device is arranged in one to one correspondence to the numerical control section, data sampling intervals when grasping the operating condition of the machine tool can be adequately made short, thereby enabling to accurately grasp the operating condition. In addition, an oversight in taking the data does not occur.

In addition, said operation data accumulation and transmission device in accordance with the present invention, may comprise:

operation data storage means for accumulating the data on the operating condition of said machine tool; and data collection and transmission means for performing a process for connecting to said numerical control section, collecting the data on the operating condition of said machine tool, and storing the collected operating condition data in said operation data storage means, a process for confirming whether transmission condition that has been set beforehand is satisfied or not, and a process, when the transmission condition is satisfied, for connecting the Internet, and transmitting the operating condition data stored in said operation data storage means to said operation management device in an E-mail data format, and releasing the connection to the Internet after completion of the transmission.

According to this operation management system, first, the operating condition data of the machine tool corresponding to the numerical control section is collected therefrom by the data collection and transmission means of the operation data accumulation and transmission device, and the collected operating condition data is stored in the operation data storage means.

Then, the transmission condition that has been set beforehand is confirmed whether it is satisfied or not at any time, when the transmission condition is satisfied, the operating condition data stored in said operation data storage means is transmitted to said operation management device in the E-mail data format by connecting the Internet and the connection to the Internet is released after completion of the transmission. Then, the operating condition data is accumulated by said operation management device for every corresponding machine tool.

Incidentally, said transmission condition can be set as a condition to an amount of data stored in said operation data storage means, in this case, said data collection and transmission means is configured so as to compare the amount of data stored in said operation data storage means to a reference amount of data set as said transmission condition, generate said transmit data when said amount of stored data reaches said reference amount of data, and transmit the generated transmit data to said operation management device.

Or, said transmission condition can be set as a condition against the time taken for said data collection, in this case, said data collection and transmission means is configured so as to compare the time taken for said data collection to a reference time set as said transmission condition, generate said transmit data when said data collection time exceeds said reference time, and transmit the generated transmit data to said operation management device.

Thus, according to this operation management system, since the operation data accumulation and transmission device connects the Internet only during the transmission so as to transmit the operating condition data, dangerous situations, such as unauthorized access, virus infection or the like can be mostly avoided, a machine tool in a remote site can also be included among management targets. In addition, wherever the operation data accumulation and transmission device of a source and the operation management device of a destination may install, there is flexibility that what is necessary is just to specify an address of the destination, and it is possible to take the data without lacking time, resulting in enabling to accurately grasp the operating condition.

In addition, since the operating condition data accumulated in said operation data storage means is transmitted to the operation management device when the transmission condition that has been set beforehand is satisfied, said operating condition data can be suitably transmitted to the operation management device at the appropriate time, thereby, it is possible to prevent the data which should be accumulated in the operation data storage means from being abandoned because of exceeding the capacity, and the operating condition data can be made more accurate.

In addition, said operation data accumulation and transmission device, in accordance with the present invention, may comprise:

operation data storage means for accumulating the data on the operating condition of said machine tool (operating condition data); and data collection and transmission means for performing a process for connecting to said numerical control section, collecting the data on the operating condition of said machine tools, and storing the collected operating condition data in said operation data storage means, a process for generating the transmit data configured so as to associate a data-element identifier which defines the item concerning the operating condition with said operating condition data corresponding to this item based on the operating condition data stored in said operation data storage means, and a process for transmitting the generated transmit data to said operation management device via the telecommunication circuits.

According to this operation data accumulation and transmission device, first, the operating condition data of the machine tool which corresponds to the numerical control section is collected therefrom by said data collection and transmission means, and this is stored in the operation data storage means.

Thus, the operating condition data accumulated in the operation data storage means is formatted into the transmit data configured so as to associate the data-element identifier which defines the item concerning the operating condition with said operating condition data corresponding to this item. The data-element identifier is a so-called tag, said item concerning the operating condition is defined by this tag, said operating condition data is formatted into the transmit data with a structure sandwiched by, for example the tags, and the item concerning the operating condition and the operating condition data are mutually associated. Then, the transmit data generated in this manner is transmitted to said operation management device via said telecommunication circuits.

On the other hand, said operation management device, comprises:

database for accumulating the operating condition data received from said operation data accumulation and transmission device; and data reception and update means for performing a process for receiving said transmit data transmitted from said operation data accumulation and transmission device, a process for analyzing said data-element identifier of the received transmit data, and recognizing the item concerning said operating condition defined by this data-element identifier, and a process for updating the operating condition data which is the data that has been stored in said database, and corresponds to said item that has been recognized by said received operating condition data.

According to this operation management device, the data-element identifier of the transmit data received from said operation data accumulation and transmission device is analyzed by the data reception and update means, the item concerning said operating condition defined by the data-element identifier is recognized, and the operating condition data which corresponds to said item that has been recognized among the data stored in said database by the received operating condition data.

As described above, since the transmit data transmitted from the operation data accumulation and transmission device has a structure where the item concerning the operating condition and the operating condition data are mutually associated, the operating condition data corresponding to the item of the operating condition can be distinguished with ease, thereby enabling the accurate updating of the data mentioned above. In addition, additions and modifications of the item for data accumulation can be made with ease.

Incidentally, said data collection and transmission means in this case is further configured so as to perform a process for confirming whether the transmission condition that has been set beforehand is satisfied or not, and may be configured so as to generated said transmit data and to transmit the generated transmit data to said operation management device when this transmission condition is satisfied.

Then, said transmission condition can be set as a condition to the amount of data stored in said operation data storage means, in this case, said data collection and transmission means is configured so as to compare the amount of data stored in said operation data storage means to the reference amount of data as said transmission condition, and when said amount of stored data reaches said reference amount of data, to generate said transmit data and transmit the generated transmit data to said operation management device.

Or, said transmission condition can be set as a condition to the time taken for said data collection, in this case, said data collection and transmission means is configured so as to compare the time taken for said data collection to the reference time as said transmission condition, and when said data collection time exceeds said reference time, to generate said transmit data, and transmit the generated transmit data to said operation management device.

Thus, the operating condition data accumulated in said operation data storage means can be suitably transmitted to the operation management device at the suitable time, it is possible to prevent the data which should be accumulated in the operation data storage means from being abandoned because of exceeding the capacity, and the operating condition data can be made more accurate.

BRIEF DESCRIPTION OF THE DRAWINGS

FIG. 3 is an explanatory drawing for describing a structure of data stored in an operation data storage section in accordance with the present embodiment;

FIG. 12 is an explanatory drawing illustrating an example of an E-mail in accordance with the present embodiment;

FIGS. 14–17 are explanatory drawings for describing examples of management in an operation management device in accordance with the present embodiment.

DESCRIPTION OF THE PREFERRED EMBODIMENT

Figure 1:
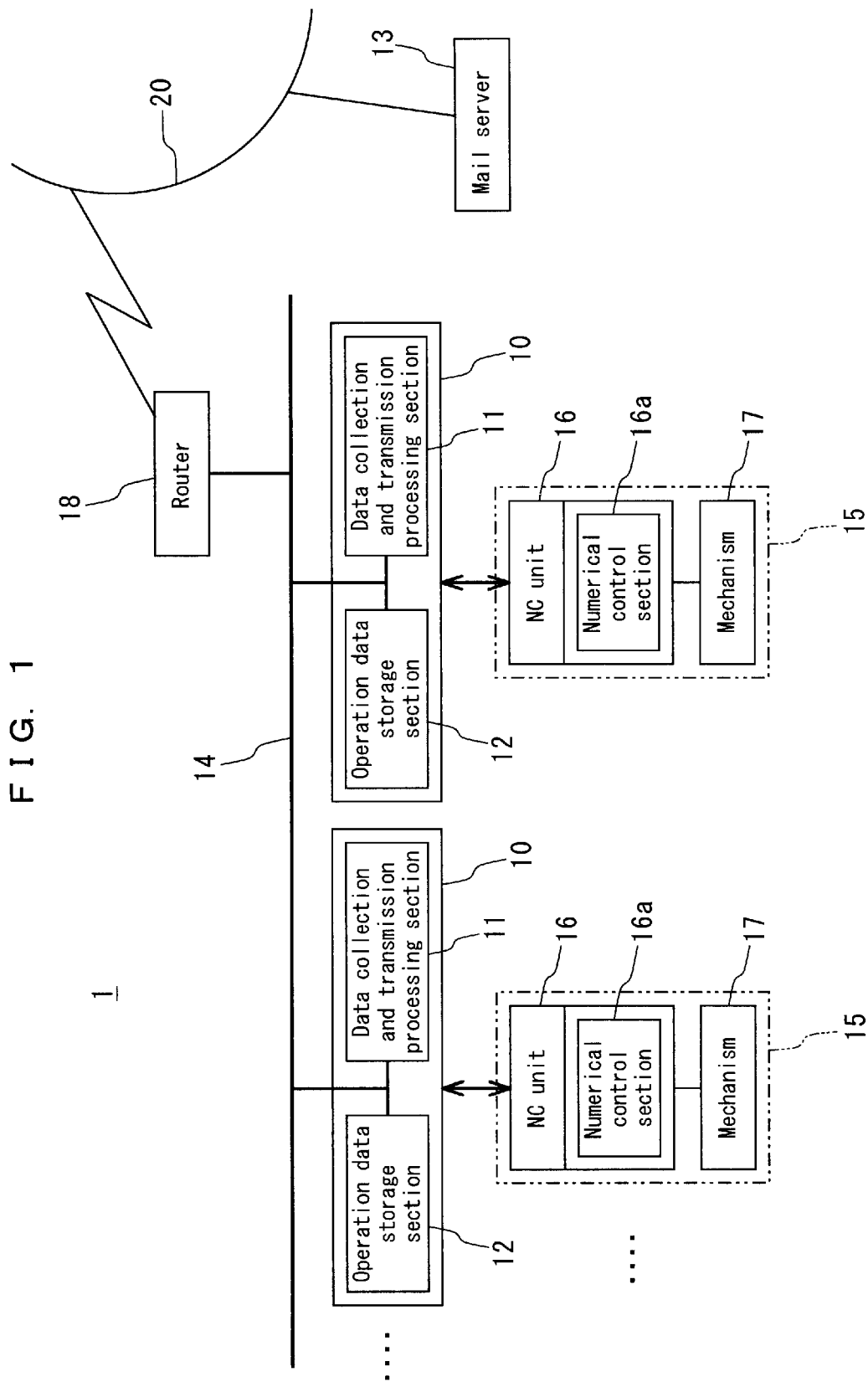
FIG. 1 is a block diagram illustrating an outline configuration of an operation data accumulation and transmission device in accordance with the present embodiment.

Hereafter, the preferred embodiment of the present invention is described based on accompanying drawings. FIG. 1 is a block diagram illustrating an outline configuration of an operation data accumulation and transmission device in accordance with the present embodiment and FIG. 2 is a block diagram illustrating an outline configuration of an operation management device in accordance with the present embodiment.

Figure 2:
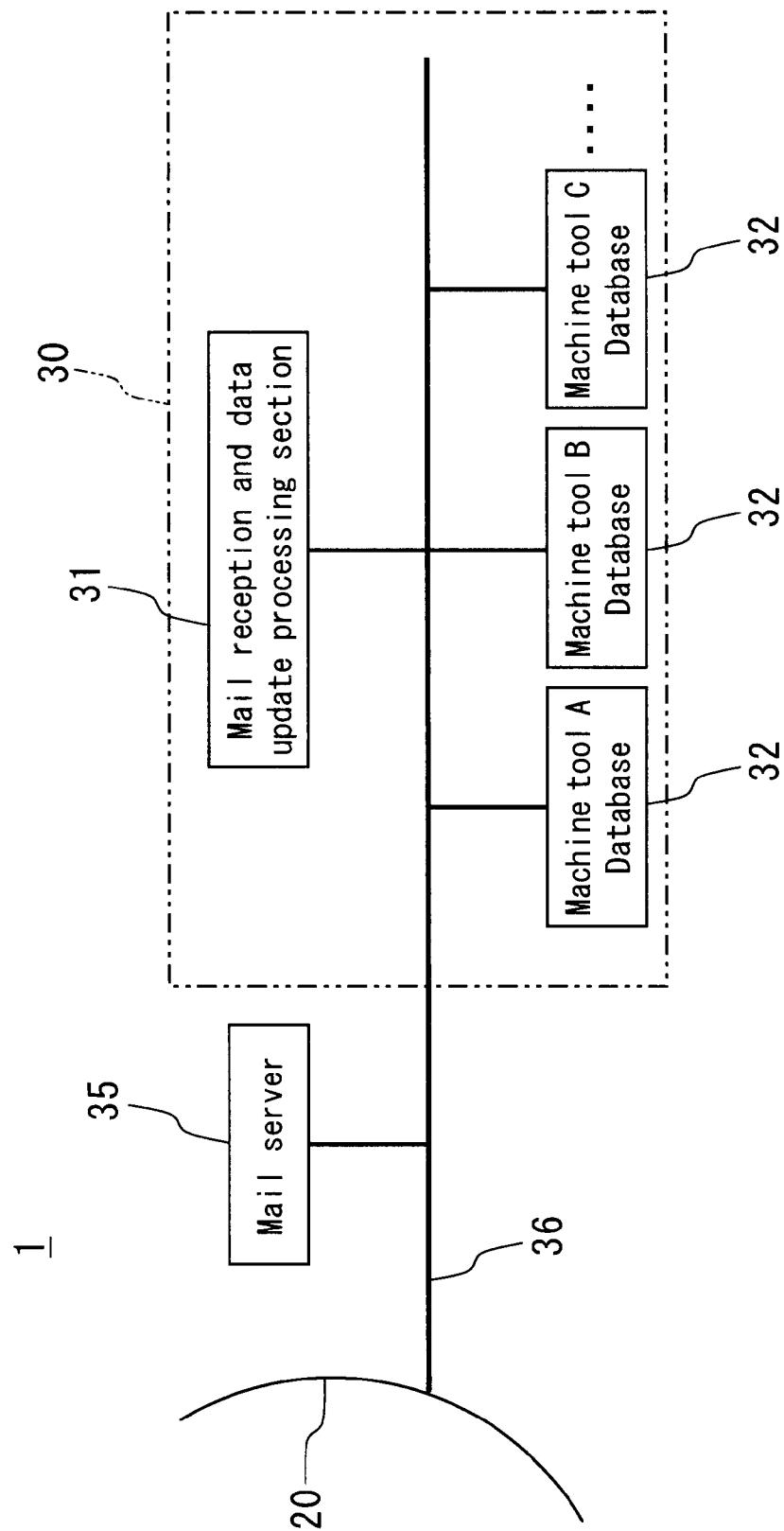
FIG. 2 is a block diagram illustrating an outline configuration of an operation management device in accordance with the present embodiment.

As shown in FIGS. 1 and 2, an operation management system 1 of this example is configured so as to connect a plurality of operation data accumulation and transmission devices 10 to an operation management device 30 via the Internet 20. A description will be made of each section in details hereafter.

A. Operation Data Accumulation and Transmission Device

As shown in FIG. 1, said operation data accumulation and transmission device 10 of this example comprises a data collection and transmission processing section 11 and an operation data storage section 12, and is connected in one to one correspondence to an NC unit 16 of a machine tool 15 which includes said NC unit 16 having a numerical control section 16a and a mechanism 17 controlled by said numerical control section 16a.

Said operation data storage section 12 is a functional section which stores operating condition data of the machine tool 15 collected by said data collection and transmission processing section 11, specifically, provides data tables, such as operating state A, operating state B, operating state C, machining performance, and alarm history shown in FIG. 3 and stores the operating condition data corresponding to each of that item. Incidentally, the "machine condition" shown in FIG. 3 is indicated with three conditions, namely, an "in operation" in a condition where the mechanism 17 is being driven, an "in suspension" in a condition where the mechanism 17 is not being driven, and an "under-alarm" where it is in an alarm condition, an "accumulated operating time" is an accumulated time of said "in operation."

Said data collection and transmission processing section 11 is configured so as to perform a process for collecting the operating condition data of the machine tool 15 from the numerical control section 16a of said NC unit 16, and storing the same in said operation data storage section 12, and a process for generating transmit data with a configuration which associates a data-element identifier (tag), which defines an item concerning operating condition, with operating condition data corresponding to this item based on the operating condition data stored in the operation data storage section 12, and a process for transmitting the generated transmit data to said operation management device 30 via said Internet 20, and specifically, is configured so that the process shown in FIGS. 4–10 may be performed.

Hereafter, the process in this data collection and transmission processing section 11 are described one after another based on FIGS. 4–10.

Figure 4:
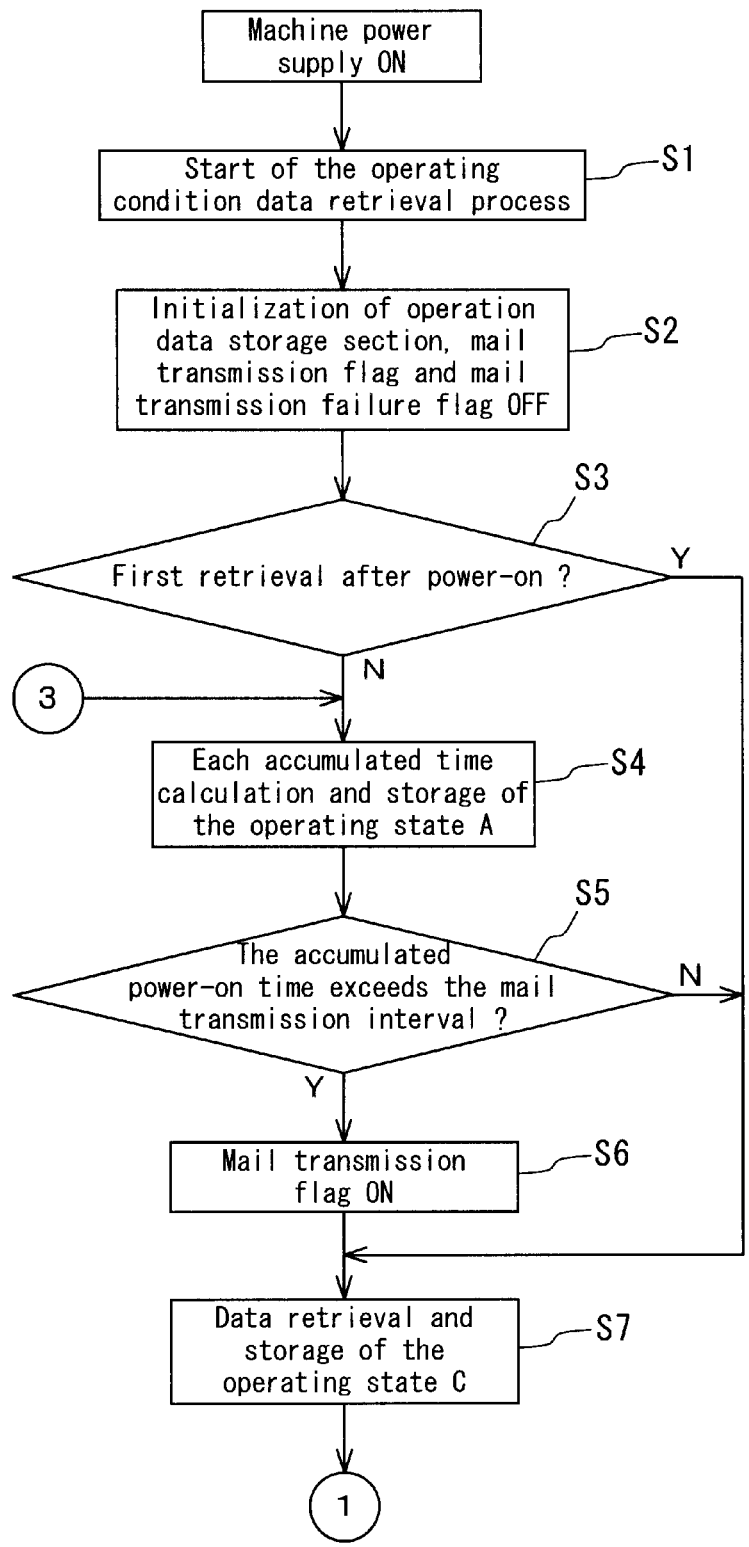
FIGS. 4–10 are flowcharts illustrating procedures in a data collection and transmission processing section in accordance with the present embodiment.

As shown in FIG. 4, said data collection and transmission processing section 11 starts a process for taking the operating condition data of the machine tool 15 after a main power supply of the machine tool 15 turns ON (step S1), firstly, initializes said operation data storage section 12, and turns OFF an mail transmission flag and an mail transmission failure flag as well (step S2).

Subsequently, after confirming whether it is a first data retrieval after the power-on or not (step S3), the process proceeds to step S7, which will be described hereafter, when it is the first data retrieval, or a process for calculating each accumulated time of the operating state A shown in FIG. 3, storing the same in said operation data storage section 12 is performed when it is a data retrieval after a second time (step S4).

Figure 7:
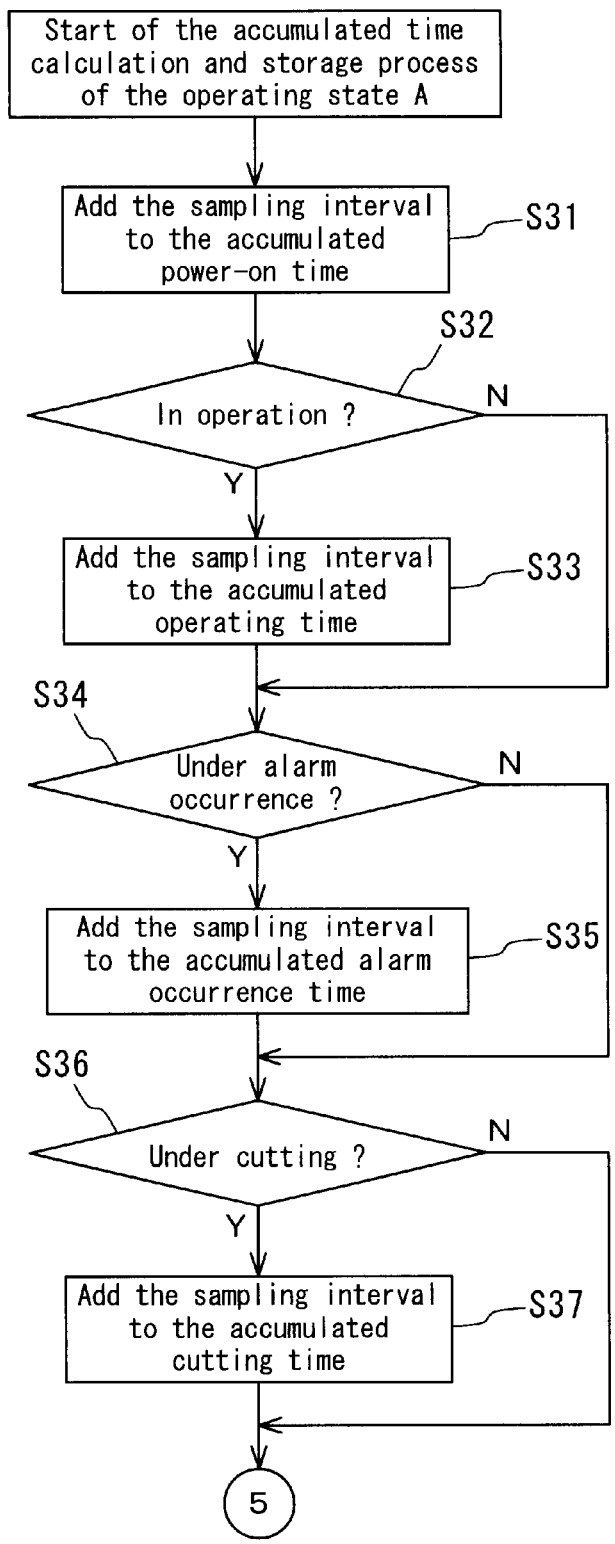
Figure 8:
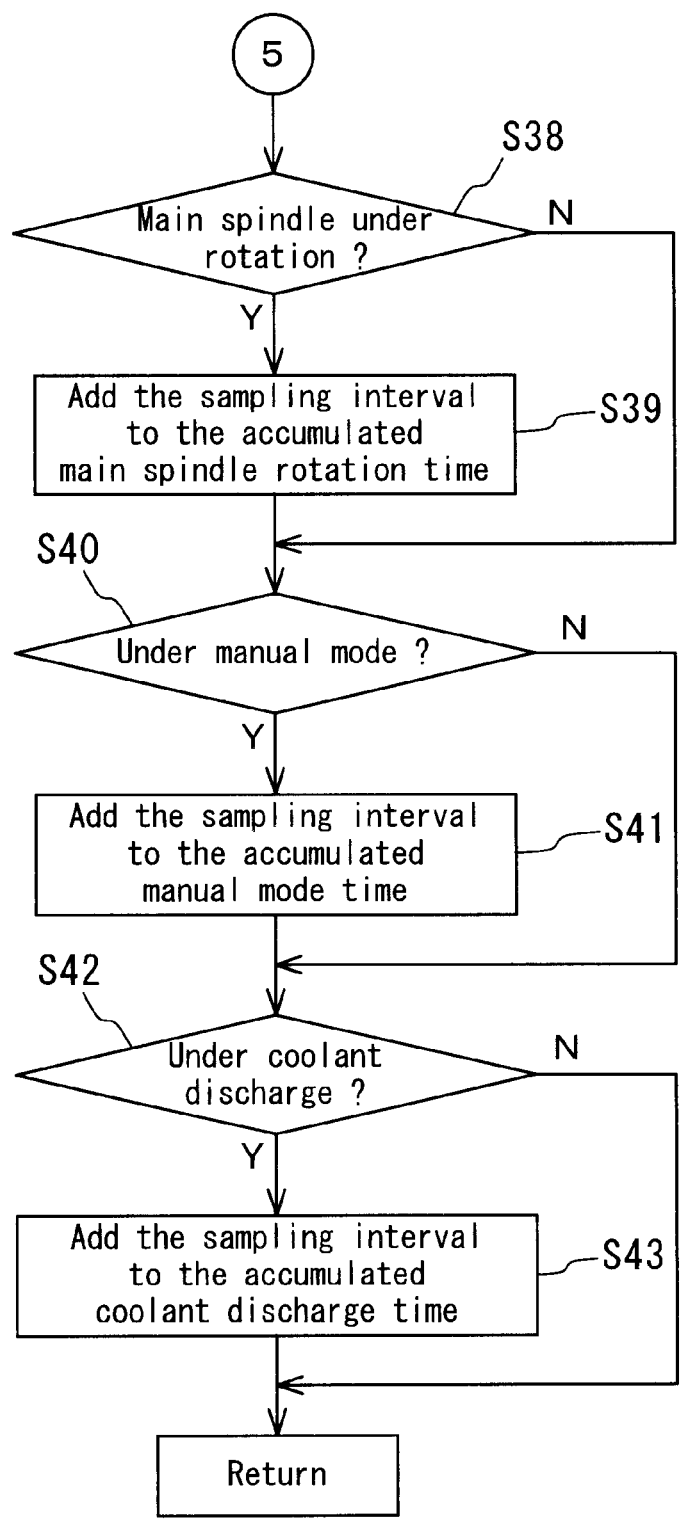

Each accumulated time calculation and storage process of this operating state A perform a process which confirms each condition of the machine tool 15, and if there is a condition corresponding thereto, adds a sampling interval to each accumulated time stored in the operation data storage section 12, after adding said sampling interval (time=time of this time sampling–time of last time sampling) to an accumulated power-on time stored in the operation data storage section 12 (step S31) as shown in FIGS. 7 and 8.

Specifically, it is confirmed whether the machine tool 15 is in operation or not (step S32), when it is in operation, said sampling interval is added to the accumulated operating time (step S33) subsequently, it is confirmed whether an alarm is being occurred or not (step S34), if the alarm is being occurred, said sampling interval is added to an accumulated alarm occurrence time (step S35), next, it is confirmed whether the machine tool 15 is under-cutting or not (step S36), if it is undercutting, said sampling interval is added to an accumulated cutting time (step S37).

Moreover, it is confirmed whether a main spindle of the machine tool 15 is under-rotation or not (step S38), if it is under-rotation, said sampling interval is added to an accumulated main spindle rotation time (step S39), subsequently, it is confirmed whether the machine tool 15 is in a manual mode or not (step S40) if it is in the manual mode, said sampling interval is added to an accumulated manual mode time (step S41) next, it is confirmed whether the machine tool 15 is discharging coolant or not (step S42), if it is discharging coolant, said sampling interval is added to an accumulated coolant discharge time (step S43).

Then, after finishing the above-mentioned accumulated time calculation and storage process, the process returns to a main process shown in FIG. 4, and proceeds to step S5.

At step S5, it is judged whether or not the accumulated power-on time stored in the operation data storage section 12 exceeds a mail transmission interval that has been set beforehand. This mail transmission interval is an interval between the time of previous mail transmission and the time of next mail transmission, and is arbitrarily set beforehand. Then, while the mail transmission flag is turned ON (step S6) when it exceeds the mail transmission interval, the process proceeds to step S7 when it does not exceed the mail transmission interval. The reason why the mail transmission is judged whether or not it is performed on the basis of the mail transmission interval other than an amount of data described later is that there is a case where an amount of data retrieved at one time may be small depending on the machining content, and in this case, it will take a long time for the amount of data to be stored in the operation data storage section 12 to reach the capacity that has been set as a transmission reference, as a result of this, the update of data at an operation management device side has not been performed for a long time.

Next, at step S7, a process for taking data concerning the operating state C shown in FIG. 3 from the numerical control section 16a, and storing the same in the operation data storage section 12 is performed. The operating state C is indicated with three conditions, "in operation", "in suspension", and "under-alarm", as mentioned above, when a change from the former machine condition occurs, the machine condition, a date and time when changing into the machine condition (a date and time when the condition starts), i.e., a date and time in the data retrieval, and its program number (O number) are mutually associated, and are stored in the operation data storage section 12. Incidentally, if no change has occurred in the machine condition, the storage process is not performed. Moreover, said date and time when the condition starts is also the date and time when the former machine condition is over.

Next, it is confirmed whether the data concerning the operating state C stored in the operation data storage section 12 in this way has amounted to 60 sets or not (step S8), while the mail transmission flag is turned ON when amounting to 60 sets (step S9), the process proceeds to step S10 when 60 sets of data have not reached. Step S8 is a process which judges whether the mail is transmitted or not, when the data exceeds 60 sets, because of exceeding the storage capacity having been set in the operation data storage section 12 on the operating state C, it is judged whether the mail transmission is performed or not on the basis of the 60 sets.

Figure 9:
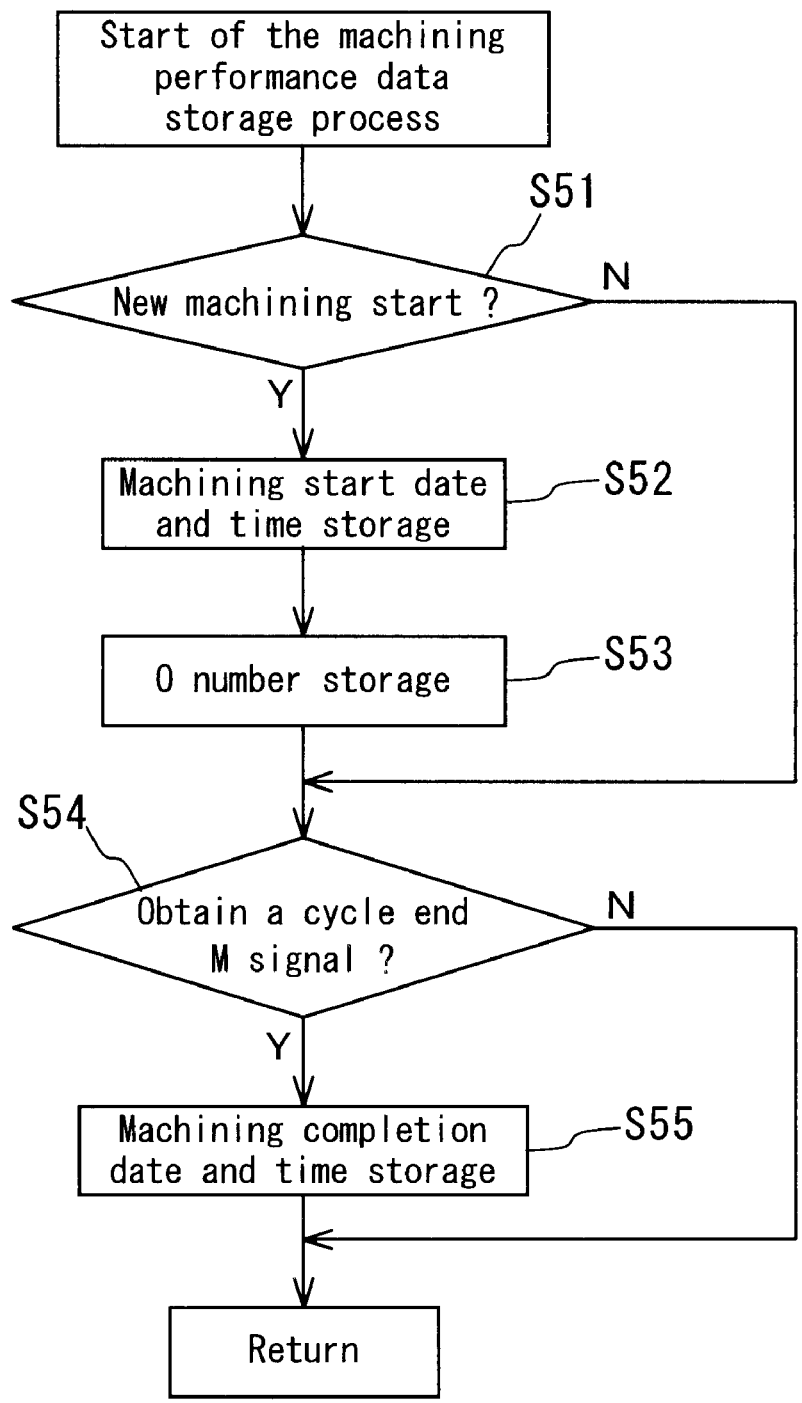

At step S10, machining performance data retrieval and storage process shown in FIG. 9 are performed. That is, it is confirmed whether the machine tool 15 has started new machining or not (step S51), if it is not a new machining, the process proceeds to step S54, if it is a new machining, the present time is stored in the operation data storage section 12 as a machining start date and time (step S52), and the O number, which is an NC program number under machining execution at present time, is also stored in the operation data storage section 12 (step S53). Incidentally, these O number and machining start date and time are mutually associated and stored in the operation data storage section 12.

After completing the process of said step S53, next, the process proceeds to step S54, and it is confirmed whether an M signal which defines machining completion (cycle end) has changed from OFF to ON or not. Then, if confirmed it having changed to ON, the present time is stored in the operation data storage section 12 as the machining completion date and time (step S55).

Figure 5:
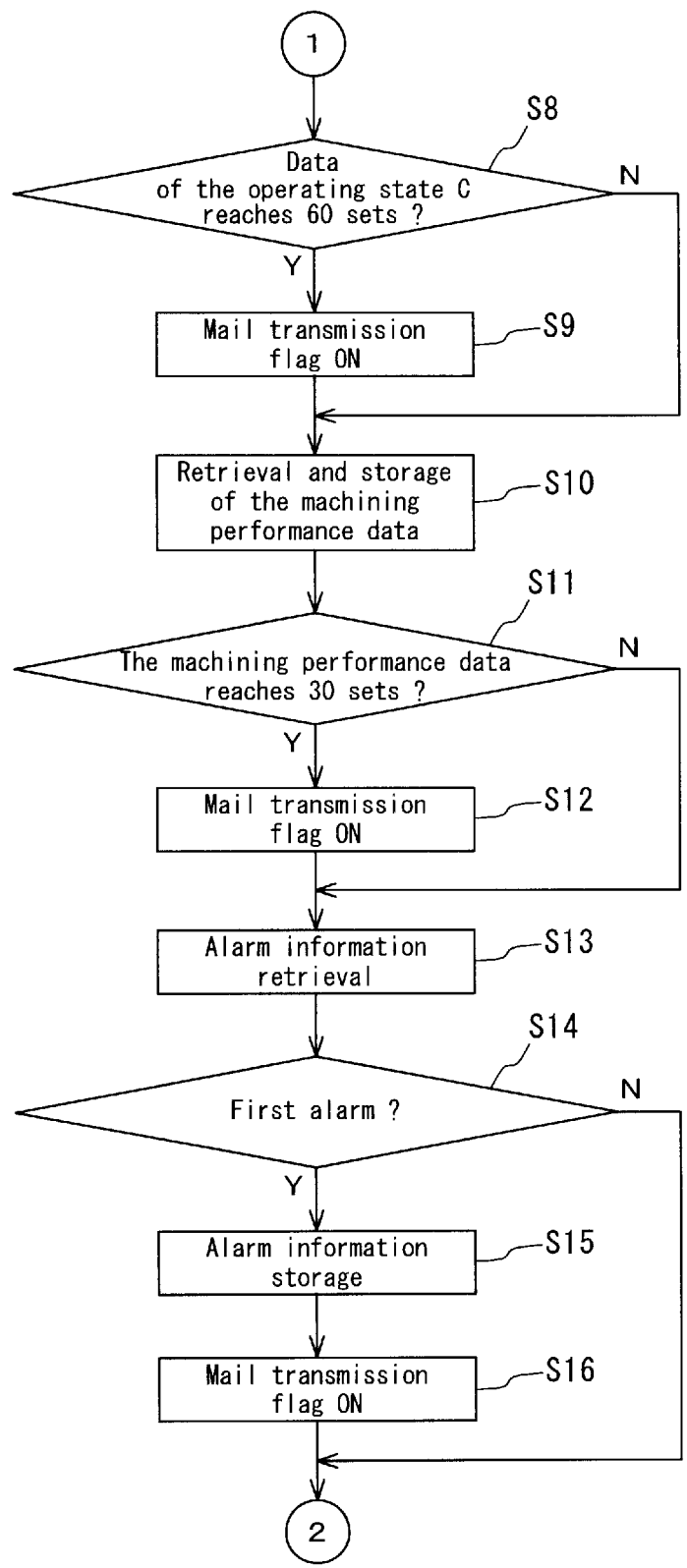
Figure 6:
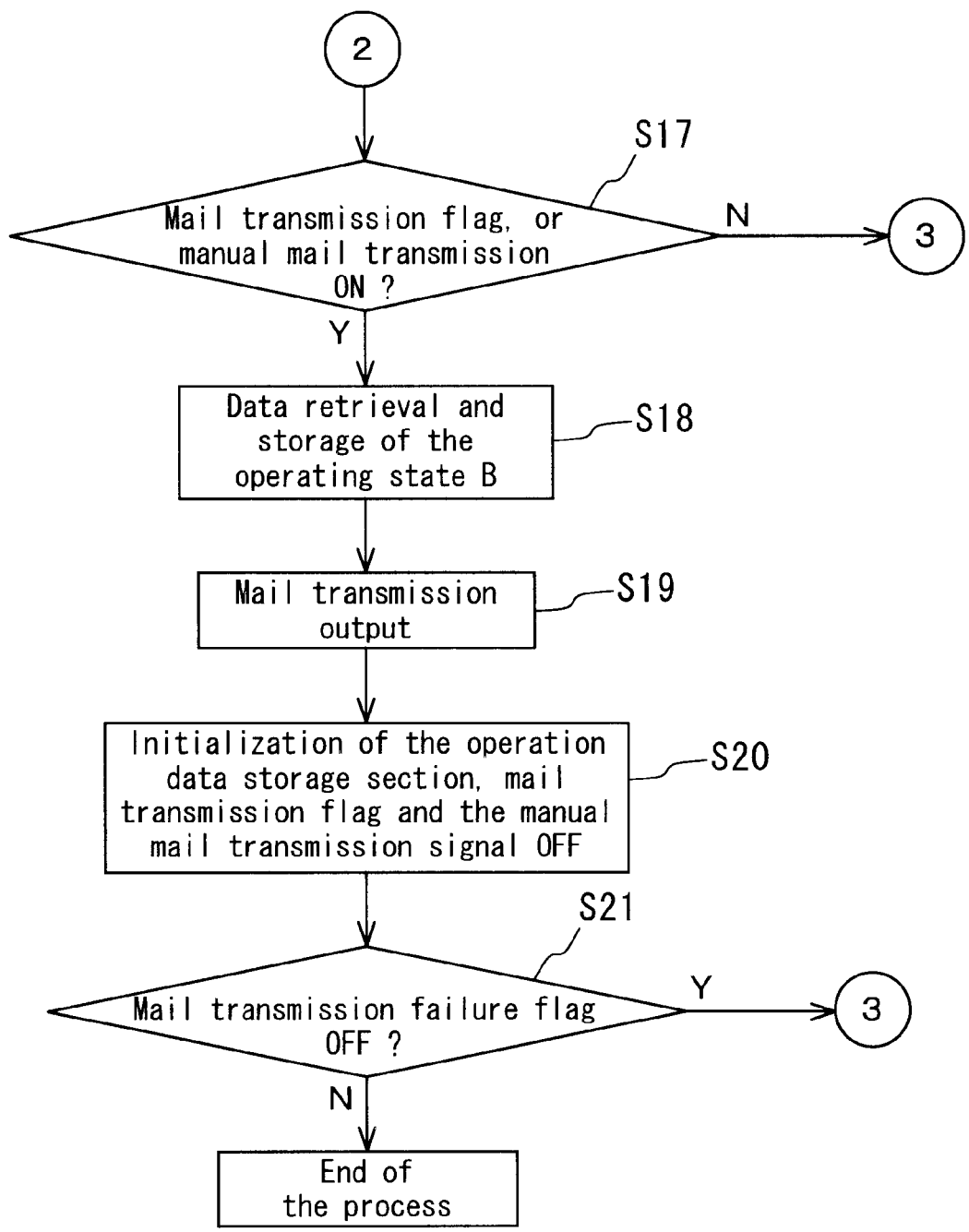

Then, after finishing a process of the above-mentioned step S55, or when the M signal is judged not have been changed from OFF to ON at said step S54, the process is completed, and the process returns to the main process shown in FIG. 5, and proceeds to step S11.

At step S11, it is confirmed whether the machining performance data stored in the operation data storage section 12 as described above has amounted to 30 sets or not, if it amounts to 30 sets, while turning ON the mail transmission flag (step S12) when not amounting to 30 sets, the process proceeds to step S13. Step S11 is a process which judges whether the mail is transmitted or not, and if the data exceeds 30 sets, because of exceeding the storage capacity that has been set in the operation data storage section 12 on the machining performance, it is judged whether the mail transmission is performed on the basis of the 30 sets or not.

Next, at step S13, alarm information is taken from the numerical control section 16a, it is confirmed whether the retrieved alarm is a first alarm or not, that is, the alarm is continuing or not (step S14), if it is a first alarm, after storing the retrieved alarm information (alarm occurrence date and time (data retrieval date and time), alarm number, alarm message, and O number when the alarm is occurred) in the operation data storage section 12 (step S15) the mail transmission flag is turned ON (step S16) Then, after completing the process of step S16, or if it is judged to be the continuing alarm in step S14, the process proceeds to next step S17.

Figures 10, 11:
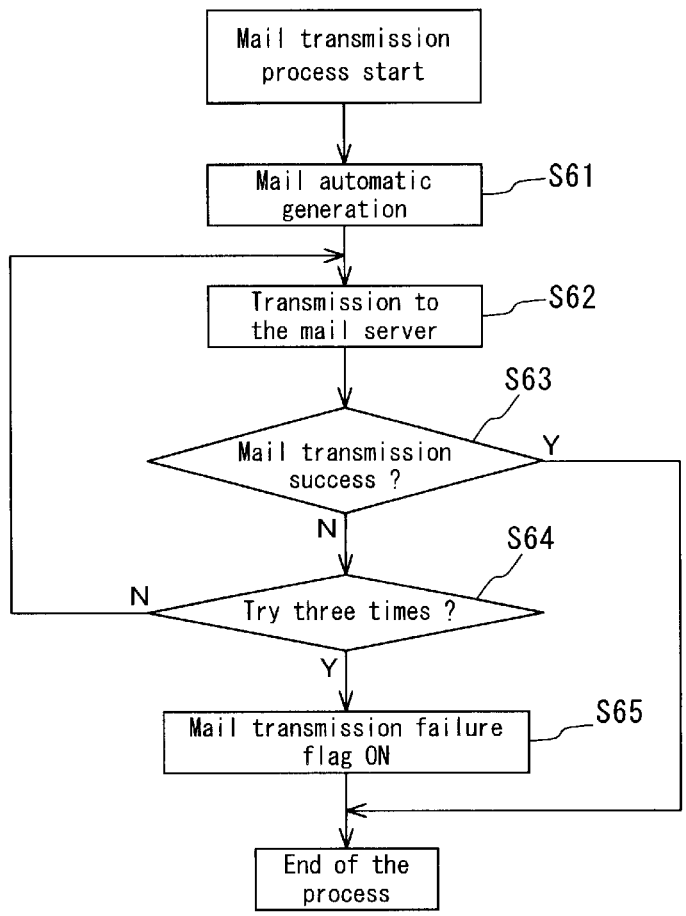
FIG. 11 is an explanatory drawing for describing automatic generation of an E-mail in accordance with the present embodiment.

Next, at step S17, it is confirmed whether or not the mail transmission flag is ON, or a manual mail transmission signal is ON or not, if both the mail transmission flag and the manual mail transmission signal are OFF, the process proceeds to the above-mentioned step S4, and the process subsequent to this is performed. On the other hand, if the mail transmission flag or the manual mail transmission signal is ON, next, after taking the data (refer to FIG. 3) concerning the operating state B from the numerical control section 16a and storing the same in the operation data storage section 12 (step S18), a mail transmission process shown in FIG. 10 is performed (step S19). Incidentally, the manual mail transmission signal here is a signal which turns ON when an operator presses a transmission switch arranged on a display so that the operating condition data can be sent to the operation management device 30 when the operator wants. Since the data stored in the operation data storage section 12 will disappear if the machine tool 15 is turned off, when the machine tool 15 is turned off, it can used for transmitting data after the previous data transmission by pressing the above-mentioned transmission switch. Thereby, the operating condition management can be performed more accurately.

The mail transmission process is simultaneously performed with the process subsequent to step S20, as shown in FIG. 10, first, at step 61, based on each data stored in the operation data storage section 12, a process for automatically generating the transmit data with an E-mail data format containing the operating condition data, as shown in FIG. 12, is performed. This E-mail consists of a header portion including a mail address of a destination or the like, and a mail text portion. Incidentally, although not shown in particular, another data storage section different from said operation data storage section 12 is further arranged, the data stored in the operation data storage section 12 is copied to said another data storage section on the occasion of the automatic generation of the above-mentioned E-mail, and the above-mentioned E-mail is automatically generated from the copied data.

The mail text consists of a tag (data-element identifier) (refer to FIG. 11) which defines the item concerning the operating condition, and the operating condition data corresponding to the item, and has a format where the operating condition data is described as being sandwiched between the corresponding tags.

When making a description of one example based on FIG. 12, <M_MCNDTL>, which is a tag, means that data concerning the operating state A and B exists hereinafter. Then, following alphabetical data are the values of each accumulated power-on time, accumulated operating time, accumulated alarm occurrence time, accumulated cutting time, accumulated main spindle rotation time, accumulated manual mode time, accumulated coolant discharge time, machine condition, O number during under-machining, sequence number, operation mode, single block flag, optional stop flag, block delete flag, dry run flag, coolant on flag, and rapid traverse override in order. Then, a tag </M_MCNDTL>, which further follows this, means that the data concerning the operating state A and B exists prior to this.

Incidentally, a definition of the tag shown in FIG. 11 is only one example, and it does not interfere at all even when it is further classified in detail and defined.

If the E-mail is automatically generated as described above, next, a process for connecting the Internet 20 and transmitting the generated E-mail to a mail server, i.e., the operation management device 30, specified beforehand, is performed (step S62). Incidentally, in this example, the above-mentioned E-mail is transmitted to a mail server 13 via a router 18, and is transferred from this mail server 13 to a mail server, in this example, a mail server 35, corresponding to a specified mail address.

Next, it is confirmed whether the mail transmission has been successful or not, and the process is completed if it has been successful (step S63), but if the transmission has failed, the transmission is repeated up to 3 times (step S64), and when it still fails in trying to transmit it 3 times, the mail transmission failure flag is turned ON, the connection to the Internet 20 is released, and the process is completed (step S65).

On the other hand, at said step S20, after initializing the operation data storage section 12, and turning OFF the mail transmission flag and the manual mail transmission signal, the mail transmission failure flag is confirmed at the next step, and it is confirmed whether the above-mentioned mail transmission process has been successful or not (step S21), if it has failed, it is judged that a certain trouble in communication has occurred, and a warning message to that effect is displayed, and the operating condition data retrieval process itself is completed. If not, the process returns to step S4 shown in FIG. 4, and the process subsequent to this is repeated.

B. Operation Management Device

On the other hand, said operation management device 30 comprises mail reception and data update processing section 31 mutually connected via a LAN 36, and databases 32 set for every said machine tool 15.

The database 32 is a functional section which accumulates the operating condition data transmitted from said operation data accumulation and transmission device 10 every machine tool 15, comprises data tables, such as the operating state A, the operating state B, the operating state C, the machining performance, and the alarm history shown in FIG. 3 every machine tool 15, and stores the operating condition data corresponding to each item.

Figure 13:
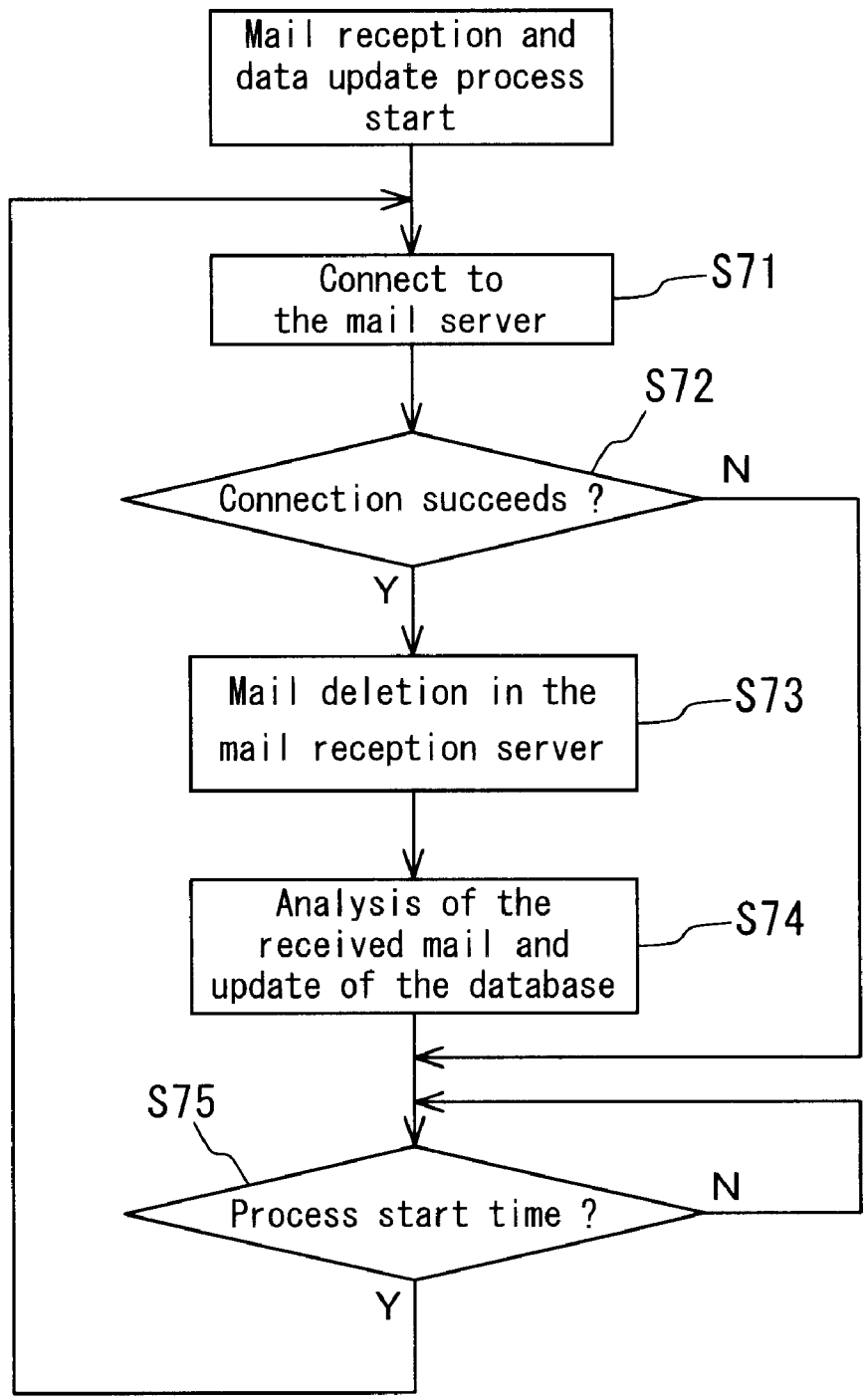
FIG. 13 is a flowchart illustrating a procedure in a mail reception and data update processing section in accordance with the present embodiment.

Moreover, said mail reception and data update processing section 31 sequentially performs a process shown in FIG. 13, and performs a process for receiving the E-mail transmitted from each said operation data accumulation and transmission device 10 to the mail server 35, analyzing the received E-mail, and updating the database corresponding to the machine tool 15 by using the operating condition data contained in the E-mail.

Specifically, as shown in FIG. 13, first, it connects to the mail server 35 (step S71), if connection is successful, it performs a process for deleting the E-mail in the mail server 35 after taking the E-mail from the mail server 35 (step S73), and then analyzes the received E-mail and updates the database corresponding to machine tool 15 by using the operating condition data contained in the E-mail (step S74).

As described above, the mail text consists of the tag which defines the item concerning the operating condition, and the operating condition data corresponding to the item, and has a format where the operating condition data is described as being sandwiched between the corresponding tags. Accordingly, the item concerning the operating condition is distinguished from the operating condition data corresponding thereto by recognizing the tag. The mail reception and data update processing section 31 analyzes such tags, recognizes a machine ID corresponding thereto, i.e., the machine tool 15, the operating condition item, and the operating condition data or the like, and updates the data stored in the database 32 of the recognized machine tool 15 by performing a process for addition, appendage and overwrite.

Then, after performing the update process of the data in a manner as described above, the process waits until a predetermined time that has been set beforehand passes (step S75), and subsequently, returns to step S71 to repeat the process. Incidentally, at step S72, even when the connection to the mail server 35 fails, similarly, the process of step S71 is also repeated after waiting for the lapse of the predetermined time at step S75.

According to the operation management system 1 of the present example provided with the above configuration, by the data collection and transmission processing section 11 of each operation data accumulation and transmission device 10, the operating condition data of the machine tool 15 corresponding to the numerical control section 16a of the NC unit 16 is collected therefrom every predetermined sampling interval, and the collected operating condition data is stored in the operation data storage section 12.

Then, in a manner described above, the accumulated operating condition data accumulated in the operation data storage section 12 is, after the lapse of the predetermined time, or when an amount of accumulated data reaches a predetermined amount, or under the manual mode, automatically formatted into the E-mail with a configuration which associates the tag for defining the item concerning the operating condition with the operating condition data corresponding to this item, and the formatted E-mail is transmitted via the mail server 13 and the mail server 35 to the operation management device 30.

Figure 14:
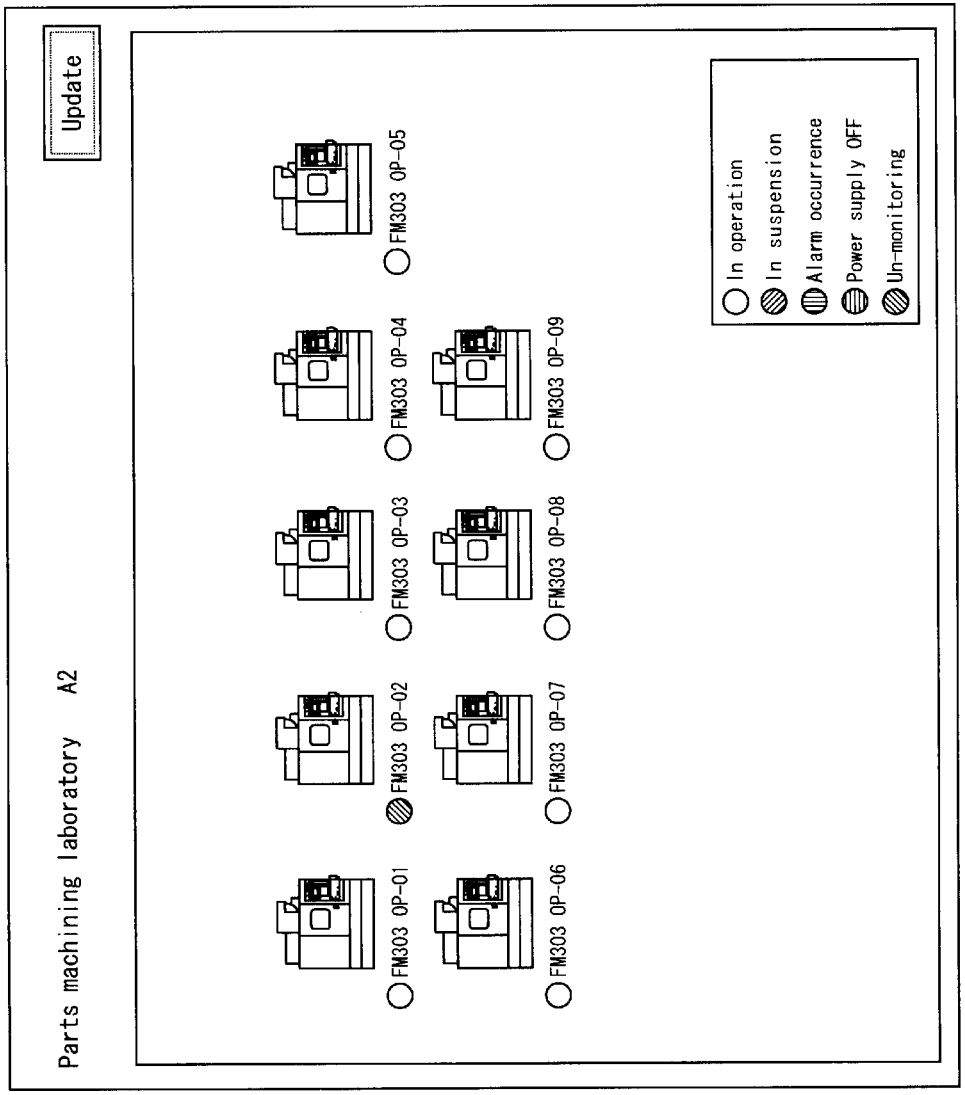
Figure 15:
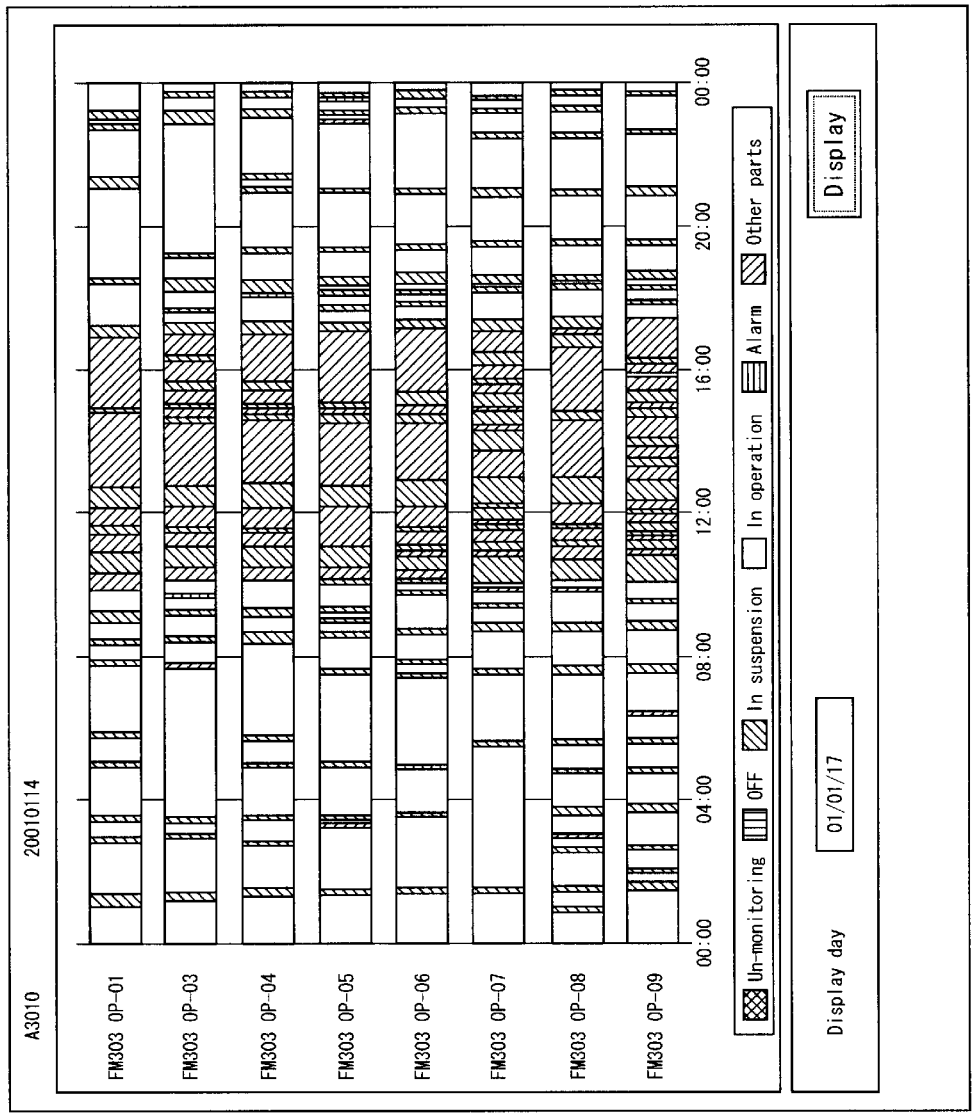
Figure 17:
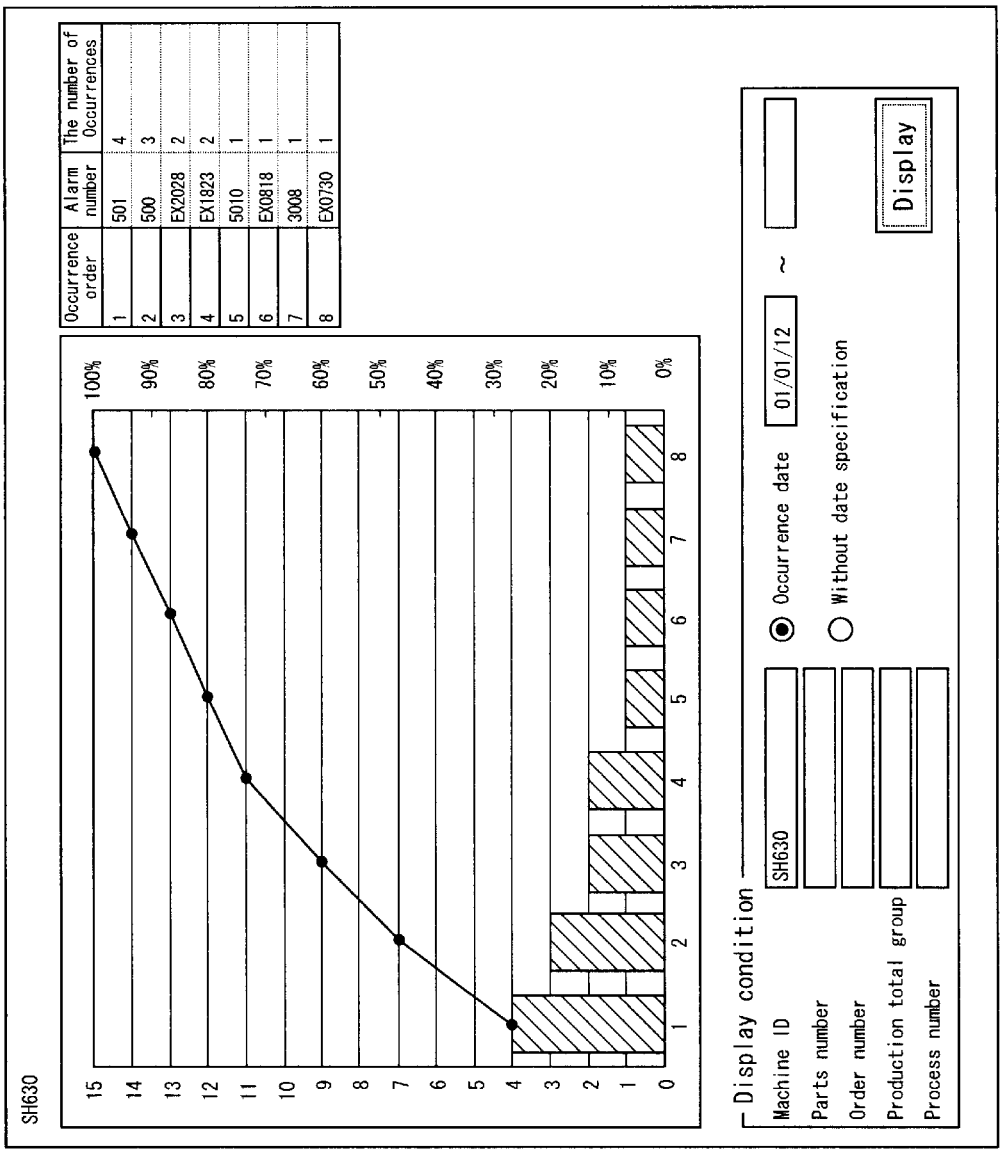

On the other hand, in the operation management device 30, the tag of the E-mail received from the mail server 35 is analyzed, the machine tool 15, the operating condition item, and the operating condition data or the like, corresponding thereto are recognized, and the data stored in the database 32 of the recognized machine tool 15 is updated by performing a process for addition, appendage and overwriting. Then, in this manner, the operation management of each machine tool 15 is performed, for example enabling the monitoring of the machine condition at a glance (FIG. 14), indicating the temporal change of the operating condition by comparison (FIG. 15), centrally managing the alarm history (FIG. 16), and performing countermeasures against the alarm utilizing a Pareto diagram (FIG. 17) or the like based on the operating condition data accumulated in the each database 32.

Thus, according to the operation management system 1 of the present preferred embodiments, since the operation data accumulation and transmission device 10 is arranged in one to one correspondence to the NC unit 16, the data sampling interval at the time of grasping the operating condition of the machine tool 15 can be made adequately detailed, thereby enabling the accurate grasping of the operating condition of the machine tool 15. In addition, oversight in taking the data does not occur.

Moreover, since the operation data accumulation and transmission device 10 connects the Internet 20 only during the transmission of the E-mail so as to transmit the E-mail, dangerous situations, such as unauthorized access, virus infection or the like can be mostly avoided, and a machine tool 15 in a remote site can also be included in the management targets. Moreover, wherever the operation data accumulation and transmission device 10 and the operation management device 30 may install, there is flexibility that what is necessary is just to specify an address of a destination.

Moreover, since the operating condition data accumulated in the operation data storage section 12 is automatically transmitted after a lapse of the predetermined time or when the amount of accumulated data exceeds the predetermined amount, it is possible to prevent the data which should be accumulated in the operation data storage section 12 from being abandoned because of exceeding the capacity, and the operating condition data can be made more accurate.

Moreover, since the E-mail transmitted from the operation data accumulation and transmission device 10 to the operation management device 30 has a structure where the item concerning the operating condition and the operating condition data are mutually associated, a correspondence relationship between the item of the operating condition and the operating condition data can be distinguished with ease, thereby enabling the more accurate updating of the data in the above-mentioned mail reception and data update processing section 31. In addition, additions and modifications of the item for data accumulation can be made with ease.

As mentioned above, although one embodiment of the present invention has been described, the specific embodiment which the present invention can employ is not limited to this at all.

For example, in the embodiment described above, although the example for transmitting the operating condition data by the E-mail via the mail server is shown, the present invention, is not limited to this, may use file transfer means, such as FTP (File Transfer Protocol), TFTP (Trivial FTP), HTTP (Hyper Text Transfer Protocol) or the like.

Moreover, in the preferred embodiment described above, although the operation data accumulation and transmission device 10 and the NC unit 16 are independently arranged, but not limited to this, the same function as the operation data accumulation and transmission device 10 may be integrally arranged within the NC unit 16.

What is claimed is:

1. An operation data accumulation and transmission device for connecting to a numerical control section of a machine tool provided with said numerical control section, collecting and accumulating data on the operating condition of said machine tool, and transmitting the accumulated data via the Internet to an operation management device, comprising:

operation data storage means for accumulating the data on the operating condition of said machine tool; and data collection and transmission means for performing a process for connecting to said numerical control section, collecting the data on the operating condition of said machine tool, and storing the collected operating condition data in said operation data storage means, a process for confirming whether a transmission condition that has been set beforehand is satisfied or not, and a process, when this transmission condition is satisfied, for connecting the Internet, transmitting the operating condition data stored in said operation data storage means to said operation management device in a data format of an E-mail, and releasing the connection to the Internet after the completion of transmission.

2. The operation data accumulation and transmission device according to clam 1, wherein said transmission condition is a condition set to an amount of data stored in said operation data storage means, and wherein said data collection and transmission means is configured so as to compare the amount of data stored in said operation data storage means to a reference amount of data as said transmission condition, and when aid amount of stored data reaches said reference amount of data, transmit the operating condition data stored in said operation data storage means to said operation management device.

3. The operation data accumulation and transmission device according to claim 1, wherein said transmission condition is a condition set to the time taken for said data collection, and wherein said data collection and transmission means is configured so as to compare the time taken for said data collection a the reference time as said transmission condition, and when said data collection time exceeds said reference time, transmit the operating condition data stored in said operation data storage me to said operation management device.

4. An operation data accumulation and transmission device for connecting to a numerical control section of a machine tool provided with said numerical control section, collecting and accumulating data on an operating condition of said machine tool, and transmitting the accumulated data via telecommunication circuits to an operation management device, comprising:

operation data storage means for accumulating the data on the operating condition of said machine tool; and data collection and transmission means for performing a process for connecting to said numerical control section, collecting the data on the operating condition of said machine tool, and storing the collected operating condition data in said operation data storage means, a process for generating the transmit data configured so as to associate a data-element identifier which defines the item concerning the operating condition with said operating condition data corresponding to this item based on the operating condition data stored in said operation data storage means, and a process for transmitting the generated transmit data via said telecommunication circuits to said operation management device.

5. The operation data accumulation and transmission device according to claim 4, wherein said data collection and transmission means is further configured so as to perform a process for confirming whether the transmission condition that has been set beforehand is satisfied or not, an when this transmission condition is satisfied, generate said transmit data, and transmit the generated transmit data to said operation management device.

6. The op ration data accumulation and transmission device according to claim 5, wherein said transmission condition is a condition set to an amount of data stored in said operation data storage means, and wherein said data collection and transmission means is configured so as to compare the amount of data stored in said o ion data storage means to a reference amount of data as said transmission condition, and when aid amount of stored data reaches said reference amount of data, generate said transmit data, and transmit the generated transmit data to said operation management device.

7. The operation data accumulation and transmission device according to claim 5, wherein said transmission condition is a condition set to the time taken for said data collection, and wherein said data collection and transmission means is configured so as to compare the time taken for said data collection the reference time as said transmission condition, and when said data collection time exceeds said reference time, generate said transmit data, and transmit the generated transmit data to said operation management device.

8. An operation management device for connecting to one or more operation data accumulation and transmission device via telecommunication circuits which connects to a numerical control section of a machine tool provided with said numerical control section, collecting and accumulating data on the operating condition of said machine tool, and generating and transmitting transmit data with a configuration for associating a data-element identifier which defines an item concerning said operating condition with said operating condition data corresponding to this item based on the accumulated operating condition data, and receiving the transmit data transmitted from said operation data accumulation and transmission device via said telecommunication circuit, comprising:

database for accumulating the operating condition data received from said operation data accumulation and transmission device; and data reception and update means for performing a process for receiving said transmit data transmitted from said operation data accumulation and transmission device, a process for analyzing said data-element identifier of the received transmit data, and recognizing the item concerning said operating condition defined by this data-element identifier, and a process for updating the operating condition data which is the data that has been stored in said database, and corresponds to said item having bee recognized by said received operating condition data.

9. An operation management system constructed by connecting one or more operation ta accumulation and transmission device according to any one of claims 1 to 3 to the operation management device via the Internet, wherein said operation management device is configured so as to receive the operating condition data transmitted from each of said operation data accumulation and transmission device, and to accumulate the operating condition data of this machine tool.

10. An operation management system constructed by connecting the operation data accumulation and transmission device according to any one of claims 4 to 7 to the operation management device according to claim 8 via the telecommunication circuits.

* * * * *